(12) United States Patent
Nagasawa (10) Patent No.: US 12,472,939 B2
(45) Date of Patent: Nov. 18, 2025

(54) AGENT APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 336 days.

(21) Appl. No.: 18/078,439

(22) Filed: Dec. 9, 2022

(65) Prior Publication Data

US 2023/0234564 A1    Jul. 27, 2023

(30) Foreign Application Priority Data

Jan. 21, 2022    (JP) ................. 2022-007926

(51) Int. Cl.
*B60W 30/08*    (2012.01)
*B60W 40/09*    (2012.01)
(Continued)

(52) U.S. Cl.
CPC ............ *B60W 30/08* (2013.01); *B60W 40/09* (2013.01); *B60W 50/14* (2013.01); *G06V 20/58* (2022.01);
(Continued)

(58) Field of Classification Search
CPC ...... B60W 30/08; B60W 40/09; B60W 50/14; B60W 2050/146; B60W 2420/403;
(Continued)

(56) References Cited

FOREIGN PATENT DOCUMENTS

JP    2000-193480 A    7/2000
JP    2003-281652 A    10/2003
(Continued)

OTHER PUBLICATIONS

Morisawa et al., JP2009297892 (A)—machine translation by EPO (Year: 2009).*
(Continued)

*Primary Examiner* — Yuen Wong
(74) *Attorney, Agent, or Firm* — MCGINN I.P. LAW GROUP, PLLC (57) ABSTRACT

An agent apparatus includes an agent, an impact detection processor, an occupant information acquisition unit, a vehicle information acquisition unit, a surrounding-environment information acquisition unit, and an agent control unit. The agent is disposed visually recognizable from an outside of a vehicle. The impact detection processor detects an impact on the vehicle. The occupant information acquisition unit acquires, if the impact is detected, occupant information regarding a state of an occupant of the vehicle. The vehicle information acquisition unit acquires, if the impact is detected, vehicle information regarding a state of the vehicle. The surrounding-environment information acquisition unit acquires surrounding-environment information regarding a surrounding environment of the vehicle. The agent control unit is configured to cause the agent to operate on the basis of any of the occupant information, the vehicle information, and the surrounding-environment information and thereby send information toward a surrounding region of the vehicle.

13 Claims, 9 Drawing Sheets

(51) Int. Cl.
*B60W 50/14* (2020.01)
*G06V 20/58* (2022.01)

(52) U.S. Cl.
CPC . *B60W 2050/146* (2013.01); *B60W 2420/403* (2013.01)

(58) Field of Classification Search
CPC ........ G06V 20/58; G06V 20/597; G08B 5/32; G08B 5/24; G08B 25/016; G08G 1/096791; B60R 21/02; B60R 2021/0027; G07C 5/008
See application file for complete search history.

(56) References Cited

FOREIGN PATENT DOCUMENTS

| | | | |
|---|---|---|---|
| JP | 2009297892 A | * | 12/2009 |
| JP | 2015047886 A | * | 3/2015 |
| JP | 2015-178288 A | | 10/2015 |
| JP | 2020-116990 A | | 8/2020 |

OTHER PUBLICATIONS

Kanamori, JP2015047886 (A)—machine translation by EPO (Year: 2015).*
Japanese Office Action, dated Oct. 7, 2025 in Japanese Application No. 2022-007926 and English Translation Thereof.

* cited by examiner

AGENT APPARATUS

CROSS-REFERENCE TO RELATED APPLICATIONS

The present application claims priority from Japanese Patent Application No. 2022-007926 filed on Jan. 21, 2022, the entire contents of which are hereby incorporated by reference.

BACKGROUND

The disclosure relates to an agent apparatus.

A technique has been proposed that calls attention of an occupant, including a driver, or a pedestrian by an anthropomorphic agent upon vehicle traveling.

For example, Japanese Unexamined Patent Application Publication (JP-A) No. 2015-047886 discloses to provide an in-vehicle robot outside a vehicle compartment in order to notify, for example, a pedestrian of the driver's intention by a method different from turning on a headlamp or signaling by a horn. The in-vehicle robot is configured to change its posture in accordance with a state of a vehicle.

For example, Japanese Unexamined Patent Application Publication (JP-A) No. 2009-297892 discloses that, upon an accident, a robot reports the accident to a rescue center and performs a predetermined rescue operation in accordance with an instruction given by the rescue center.

SUMMARY

An aspect of the disclosure provides an agent apparatus that includes an agent, an impact detection processor, an occupant information acquisition unit, a vehicle information acquisition unit, a surrounding-environment information acquisition unit, and an agent control unit. The agent is to be disposed to be visually recognizable at least from an outside of a vehicle. The impact detection processor is configured to detect an impact of a predetermined value or greater on the vehicle. The occupant information acquisition unit is configured to, in a case where the impact is detected, acquire occupant information regarding a state of an occupant of the vehicle. The vehicle information acquisition unit is configured to, in the case where the impact is detected, acquire vehicle information regarding a state of the vehicle. The surrounding-environment information acquisition unit is configured to acquire surrounding-environment information regarding a surrounding environment of the vehicle. The agent control unit is configured to cause the agent to operate on the basis of any of the occupant information, the vehicle information, and the surrounding-environment information and thereby send information toward a surrounding region of the vehicle.

An aspect of the disclosure provides an agent apparatus that includes an agent, an impact detection processor, and circuitry. The agent is to be disposed to be visually recognizable at least from an outside of a vehicle. The impact detection processor is configured to detect an impact of a predetermined value or greater on the vehicle. The circuitry is configured to acquire occupant information regarding a state of an occupant of the vehicle in a case where the impact is detected. The circuitry is configured to acquire vehicle information regarding a state of the vehicle in the case where the impact is detected. The circuitry is configured to acquire surrounding-environment information regarding a surrounding environment of the vehicle. The circuitry is configured to cause the agent to operate on the basis of any of the occupant information, the vehicle information, and the surrounding-environment information and thereby send information toward a surrounding region of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Upon an accident such as a contact, a person such as a pedestrian present in a surrounding region of an accident vehicle is not always able to decide by himself or herself an appropriate way to deal with the accident situation. However, the person such as the pedestrian present in the surrounding region of the accident vehicle may be able to react appropriately if he or she is given an instruction.

A technique disclosed in JP-A No. 2015-047886 provides an in-vehicle robot that calls attention upon traveling but does not consider, for example, sending information to a pedestrian that is present in a surrounding region upon an accident such as a contact. A technique disclosed in JP-A No. 2009-297892 provides a robot that, upon an accident, reports the accident to a rescue center, but does not consider sending information to a pedestrian that is present around a surrounding region either.

It is desirable to, in a case where an accident of a vehicle occurs, send information corresponding to a situation of the accident toward a surrounding region of the vehicle and thereby perform prompting related to performing an appropriate procedure.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 1:
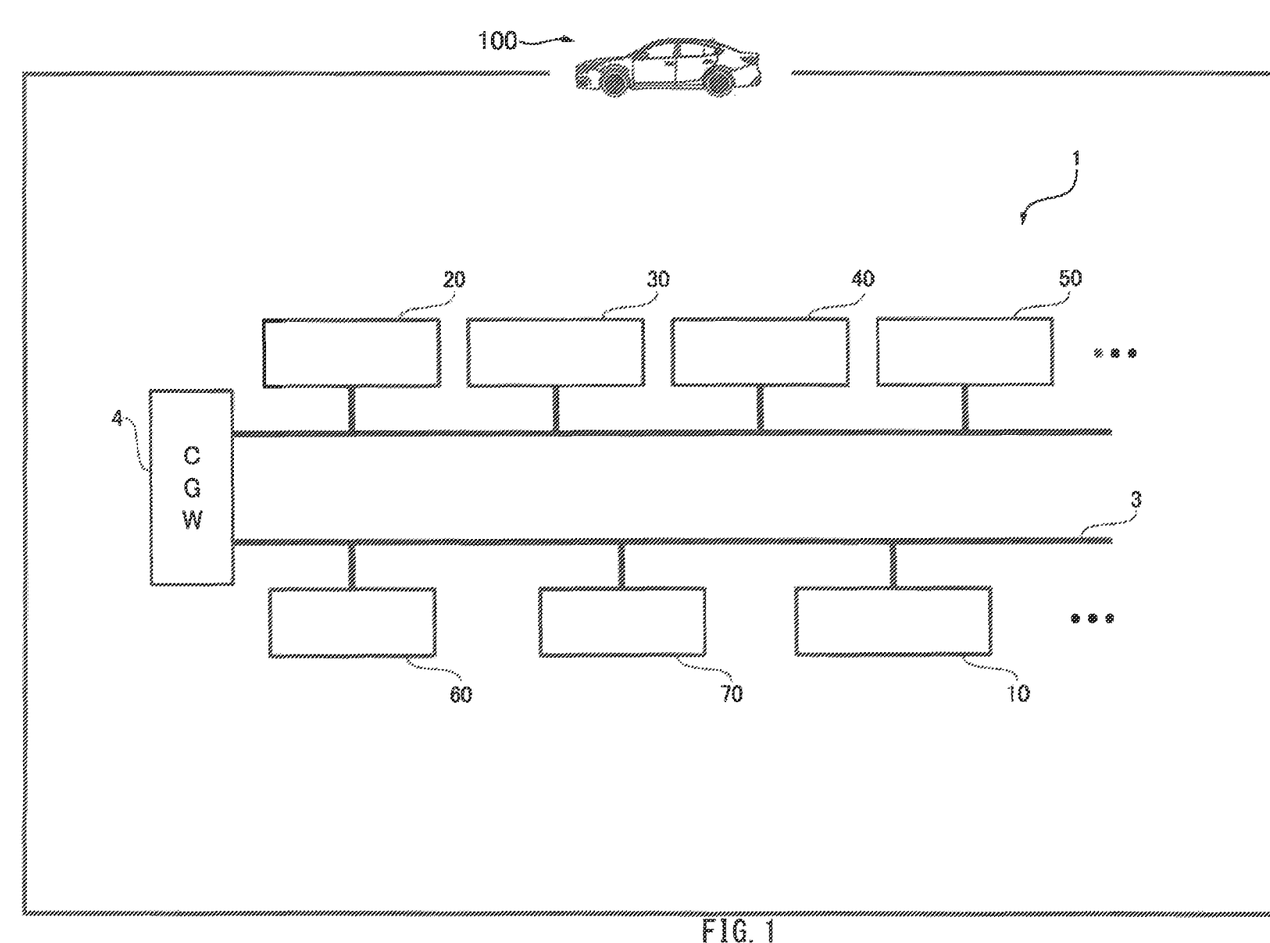
FIG. 1 is an explanatory diagram illustrating a schematic configuration of a vehicle control system including an agent apparatus according to one example embodiment of the disclosure.

As illustrated in FIG. 1, an agent apparatus according to an example embodiment of the disclosure may operate as a portion of a vehicle control system 1 and may be provided to a vehicle 100. The vehicle control system 1 may include various electronic devices to be used for traveling of the vehicle 100 and also include in-vehicle electronic control units (ECUs) that control the electronic devices. The electronic devices and the in-vehicle ECUs may be communicably coupled to each other via an in-vehicle network 3 such as a controller area network (CAN) or a local interconnect network (LIN). In addition, the devices and the in-vehicle ECUs may be coupled to a central gateway (CGW) 4, which is a relay device, to thereby operate as a portion of the vehicle control system 1.

Each of the in-vehicle ECUs may include, for example, a processor such as a central processing unit (CPU) or a micro processing unit (MPU), electric circuitry, and a storage device such as a random-access memory (RAM) or a read-only memory (ROM). The operation of the in-vehicle ECUs may be entirely or partially implemented by hardware such as an application specific integrated circuit (ASIC), a field-programmable gate array (FPGA), or a graphics processing unit (GPU).

In the following, a detailed description and illustration are omitted for some of the electronic devices and some of the in-vehicle ECUs that are not directly related to an agent ECU 10 or the agent apparatus according to the example embodiment.

As illustrated in FIG. 1, the vehicle control system 1 may include, as the in-vehicle ECUs, the agent ECU 10, an impact detection ECU 20, an occupant monitoring ECU 30, a vehicle monitoring ECU 40, a surrounding-environment monitoring ECU 50, a communication ECU 60, and a notification ECU 70. Each of the in-vehicle ECUs may be coupled to an electronic device to control, and may control the coupled electronic device on the basis of information or data acquired from the in-vehicle network 3. In addition, each of the in-vehicle ECUs may supply, to the in-vehicle network 3, information or data regarding an operation of the electronic device acquired from the coupled electronic device.

That is, in the example embodiment, the agent ECU 10, the impact detection ECU 20, the occupant monitoring ECU 30, the vehicle monitoring ECU 40, the surrounding-environment monitoring ECU 50, the communication ECU 60, and the notification ECU 70 may perform mutual information transmission and reception. The agent ECU 10 may control an agent 200 illustrated in FIG. 2 to be described later, for example, on the basis of information regarding a state of an occupant, a state of a vehicle, and a surrounding environment received from the occupant monitoring ECU 30, the vehicle monitoring ECU 40, and the surrounding-environment monitoring ECU 50, and thereby send information toward a surrounding region of the vehicle, for example, after the impact detection ECU 20 detects an impact. Details of the agent ECU 10 will be described later.

The impact detection ECU 20 may detect an impact on the vehicle 100 and thereby detect a situation such as a vehicle accident or an emergency. In one embodiment, the impact detection ECU 20 may serve as an "impact detection processor" configured to detect an impact. For example, coupled to the impact detection ECU 20 may be a device such as an acceleration sensor that detects an impact on the vehicle 100 on the basis of an acceleration of the vehicle 100. In a case where the acceleration or a deceleration of the vehicle 100 becomes a predetermined value or greater, the impact detection ECU 20 may detect the impact on the vehicle 100. Upon detecting the impact on the vehicle 100, the impact detection ECU 20 may supply an impact detection signal to the in-vehicle network 3.

The occupant monitoring ECU 30 may be included, for example, in a driver monitoring system (DMS), that monitors an occupant present in the vehicle 100. The occupant monitoring ECU 30 may monitor the occupant by controlling an electronic device included in the DMS, such as a camera, a microphone, a light-emitting diode (LED) illuminating the occupant, a seating sensor provided on a seat, or a door open and close sensor, any of which is not illustrated.

For example, the occupant monitoring ECU 30 may extract data indicating the state of the occupant from a vehicle inside image captured by the camera, an output value obtained by the seating sensor, a measured value obtained by a seating load sensor, an ON/OFF state of a seat belt, and an output value obtained by a vital sensor. The occupant monitoring ECU 30 may supply, to the in-vehicle network 3, occupant information generated from the extracted data. The occupant information may include, for example, information regarding a seating position, a heart rate of the occupant, a blood pressure of the occupant, a direction of the occupant's face, a conscious/unconscious state, a posture, an eye-lid state, and whether the occupant is able to move or is transferable. In a case where a plurality of occupants is present in the vehicle 100, the occupant monitoring ECU 30 may acquire information regarding each of the occupants.

Whether the occupant is transferable may be defined as follows. Assume a case where the occupant is injured due to the impact on the vehicle 100. If the occupant is not able to transfer by himself or herself but it is acceptable that a pedestrian in the surrounding region of the vehicle 100 moves the occupant out of the vehicle 100, the occupant may be transferable. If the occupant is not to be moved and is to wait for arrival of an ambulance or the like, the occupant may be non-transferable.

The vehicle monitoring ECU 40 may monitor a state of the vehicle 100, for example, on the basis of an output value obtained by a sensor group or a temperature sensor that detects temperatures inside and outside the vehicle 100. The sensor group may include, for example, a wheel speed sensor, a vehicle speed sensor, a steering angle sensor, an accelerator pedal sensor, and a brake pedal sensor. The vehicle monitoring ECU 40 may generate vehicle information indicating the state of the vehicle 100 from output values obtained by the sensor group, and supply the generated vehicle information to the in-vehicle network 3. The vehicle information may include, for example, information regarding a load applied to the vehicle 100 and information regarding a temperature and a change in temperature inside the vehicle 100. The load applied to the vehicle 100 may be recognized, for example, from a driving state of each motor and a state of electricity supply to an in-vehicle device.

The surrounding-environment monitoring ECU 50 may be included, for example, in an advanced driver-assistance systems (ADAS) that assists driving of the vehicle 100, and may monitor the surrounding environment of the vehicle 100 by a sensor group included in the ADAS. The sensor group may include a camera, a radar, and other various sensors. That is, the surrounding-environment monitoring ECU 50 may supply, to the in-vehicle network 3, information regarding, for example, the followings on the basis of data acquired from the sensor group. The information to supply to the in-vehicle network 3 may include information regarding respective shapes of a moving object, a structure, and a road; respective distances from the vehicle 100 to the moving object, the structure, and the road; and respective positional relationships between the vehicle 100 and the moving object, the structure, and the road. Examples of the moving object may include a person and a vehicle that are present in the surrounding environment of the vehicle 100.

Note that each of the occupant monitoring ECU 30, the vehicle monitoring ECU 40, and the surrounding-environment monitoring ECU 50 may acquire various kinds of information and supply information to the in-vehicle network 3, for example, at a predetermined cycle.

The communication ECU 60 may wirelessly communicate with a communication addressee outside the vehicle 100 and perform transmission and reception of various kinds of information therewith. Examples of such a communication addressee may include: a communication terminal device that is present within a predetermined range from the vehicle 100; a communication device included in a vehicle that is traveling in the surrounding environment of the vehicle 100; and an emergency report center that is managed by a private or public institution.

That is, while being coupled to a communication line for the communication addressee outside the vehicle 100, the communication ECU 60 may transmit the information acquired from the in-vehicle network 3 to the communication addressee and supply various kinds of information received from the communication addressee to the in-vehicle network 3. It may be thus possible to report a situation of the vehicle 100 to the emergency report center to request a rescue and acquire information related to an appropriate procedure from the emergency report center.

As described above, in a case where the information is supplied at the predetermined cycle from the occupant monitoring ECU 30, the vehicle monitoring ECU 40, and the surrounding-environment monitoring ECU 50, the communication ECU 60 may be able to report a real-time situation of the occupant and the vehicle 100 to the outside communication addressee including the emergency report center also in a case where the situation after the accident changes from moment to moment.

For example, the notification ECU 70 may be coupled to a speaker and a display, and may cause a voice or a sound to be outputted and cause an image to be displayed on the display toward the inside and outside of the vehicle 100. The notification ECU 70 may thus be able to send information. Note that the notification ECU 70 may be configured to send information alone or in accordance with an action performed by the agent 200 of the agent ECU 10 which will be described later. Associating the voice output by the speaker with the action by the agent 200 makes it possible to give the impression that the agent 200 is speaking to send the information.

Note that the speaker may also serve, for example, as a speaker of an in-vehicle audio device or a navigation system. As the display, for example, used may be a device such as a display panel provided on a dashboard or a head-up display (HUD) that projects an image on a front windshield.

Figure 2:
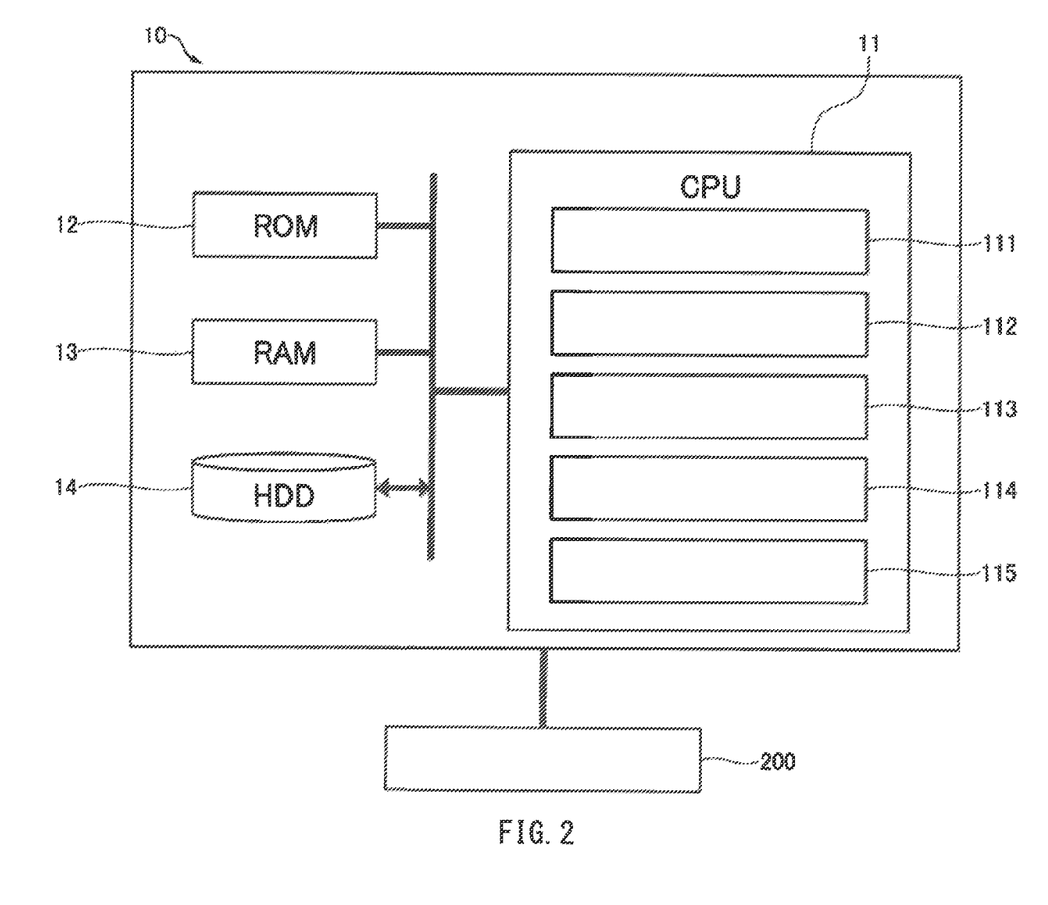
FIG. 2 is an explanatory diagram illustrating a schematic configuration of the agent apparatus according to one example embodiment of the disclosure.
Figure 3:
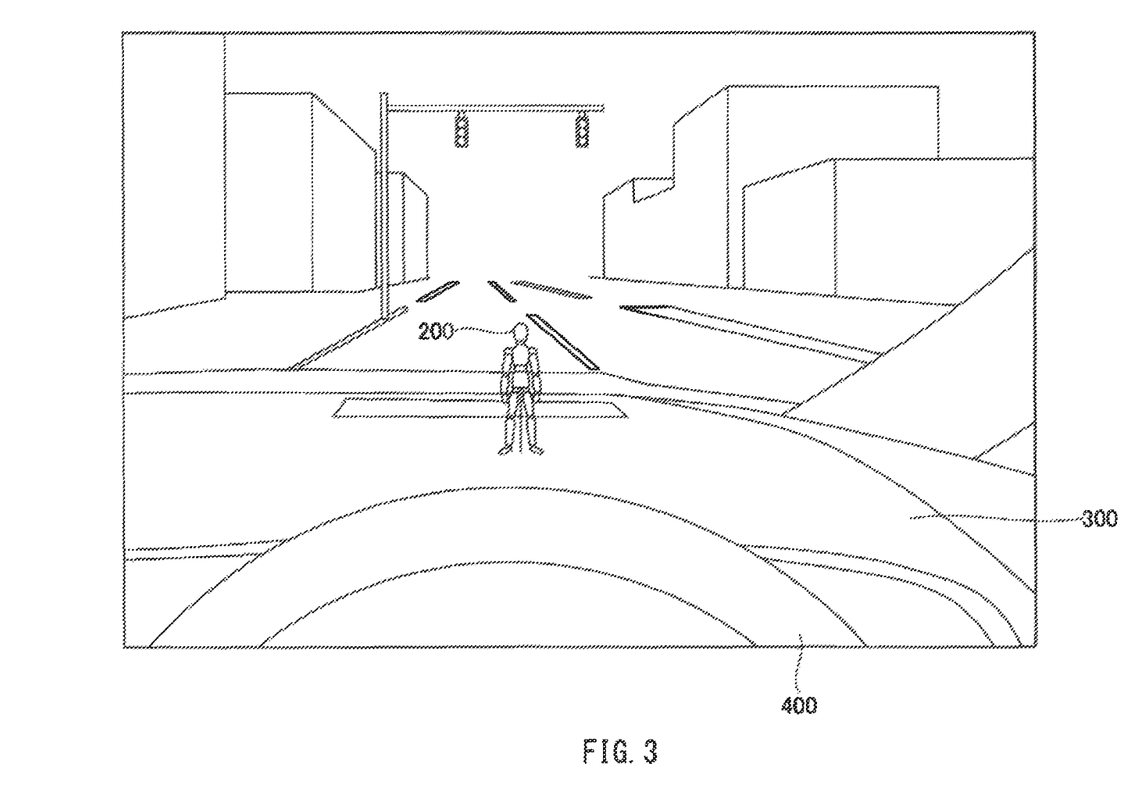
FIG. 3 is an explanatory diagram illustrating an example in which an agent of the agent apparatus according to one example embodiment of the disclosure is provided inside a vehicle compartment.
Figure 4:
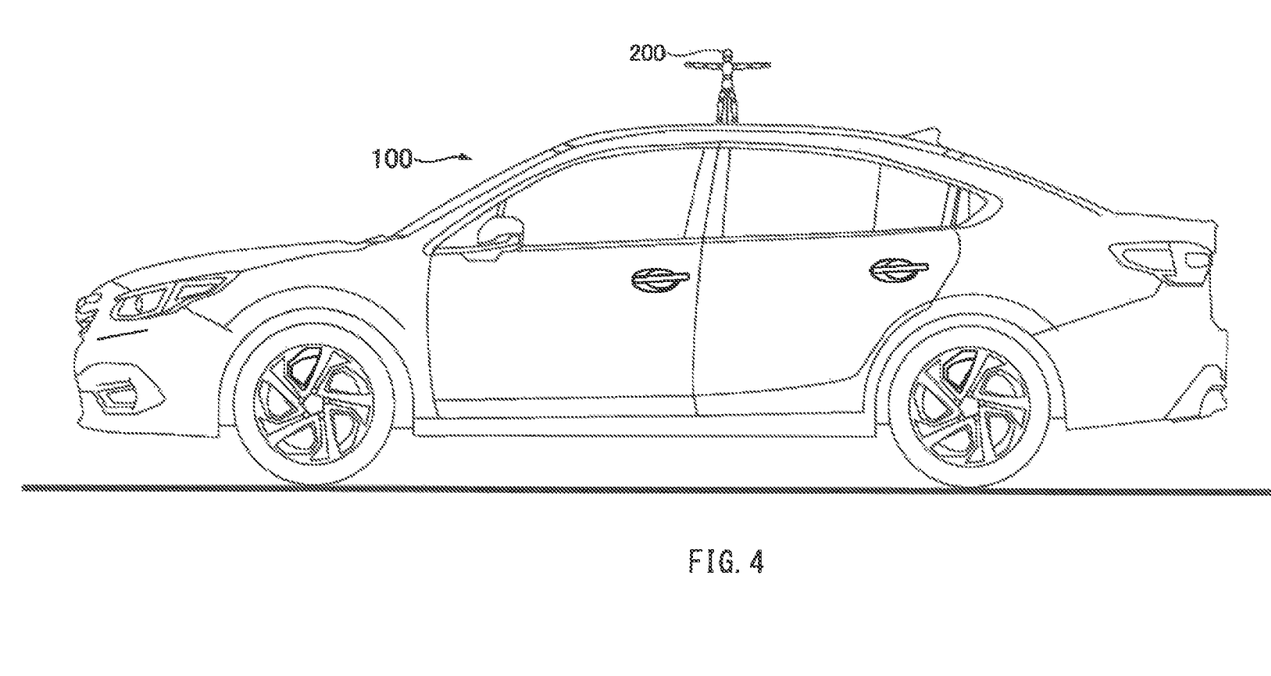
FIG. 4 is an explanatory diagram illustrating an example in which the agent of the agent apparatus according to one example embodiment of the disclosure is provided outside a vehicle.

Referring to FIGS. 2 to 4, a description is given of the agent ECU 10. In one embodiment, the agent ECU 10 may serve as an "agent apparatus".

The agent ECU 10 may cause the agent 200 to operate and send information toward the surrounding region of the vehicle 100 by means of the agent 200 (see FIG. 2).

The agent 200 may include, for example, an anthropomorphic object. Examples of the anthropomorphic object may include: a three-dimensional object such as an in-vehicle robot that has a human outer shape and performs communication and notification by speaking with a voice and by an action; and a three-dimensional display or a virtual three-dimensional object expressed as a character or a hologram displayed on the display such as the HUD. The agent 200 is disposed to be visually recognizable at least from the outside of the vehicle 100, and may be disposed to be visually recognizable from both the outside of the vehicle 100 and the occupant such as the driver of the vehicle 100.

The agent ECU 10 may control the agent 200 described above and thereby change a posture of the agent 200 and cause the agent 200 to perform an intended action. The agent ECU 10 may thus send information toward the surrounding region of the vehicle 100.

In a case where the agent 200 is the human-shaped three-dimensional object, the agent 200 may be communicably coupled to the agent ECU 10 in a wired or wireless manner, and the agent 200 may perform an action in accordance with a control signal supplied from the agent ECU 10.

In a case where the agent 200 is, for example, the character displayed on the display, for example, the agent ECU 10 may supply a control signal to the display via the notification ECU 70, cause the display to display the character serving as the agent 200, and cause the character to perform an intended action.

FIGS. 3 and 4 each illustrate an example of a position to provide the agent 200 to the vehicle 100 in the case where the agent 200 is the human-shaped three-dimensional object.

FIG. 3 illustrates an example where the agent 200 is provided inside the vehicle 100. The agent 200 may be disposed on an instrumental panel 300 with a dedicated supporting member. The posture and the direction of the agent 200 may be freely variable. Accordingly, the agent ECU 10 may be able to cause the agent 200 to face a person to whom information is to be sent.

For example, in a case where the agent 200 sends information to an occupant, the agent 200 may face the occupant. The occupant of the vehicle 100 may be able to recognize the action of the agent 200 facing the occupant while holding a steering wheel 400. In a case where the agent 200 sends information to the outside of the vehicle 100, the agent 200 may face the outside of the vehicle 100 through the front windshield.

FIG. 4 illustrates an example where the agent 200 is provided on a top surface of the vehicle 100. The agent 200 may be configured to appear from the top surface if necessary. In this case, for example, the agent 200 may face a person who is present in the surrounding environment of the vehicle 100 and the closest to the vehicle 100 and may send information to the person as an information addressee. The information addressee may be an addressee to which information is to be sent.

In both examples illustrated in FIGS. 3 and 4, the agent 200 may be the three-dimensional object having the human outer shape and may be configured to express, by an action, that the agent 200 is performing calling or questioning with respect to the information addressee. Examples of such an action may include directing its face to the information addressee and waving its hands or arms greatly in upper-lower and left-right directions. For example, see FIG. 5. This makes it possible to establish a trusting relationship between the information addressee and the agent 200.

Figure 5:
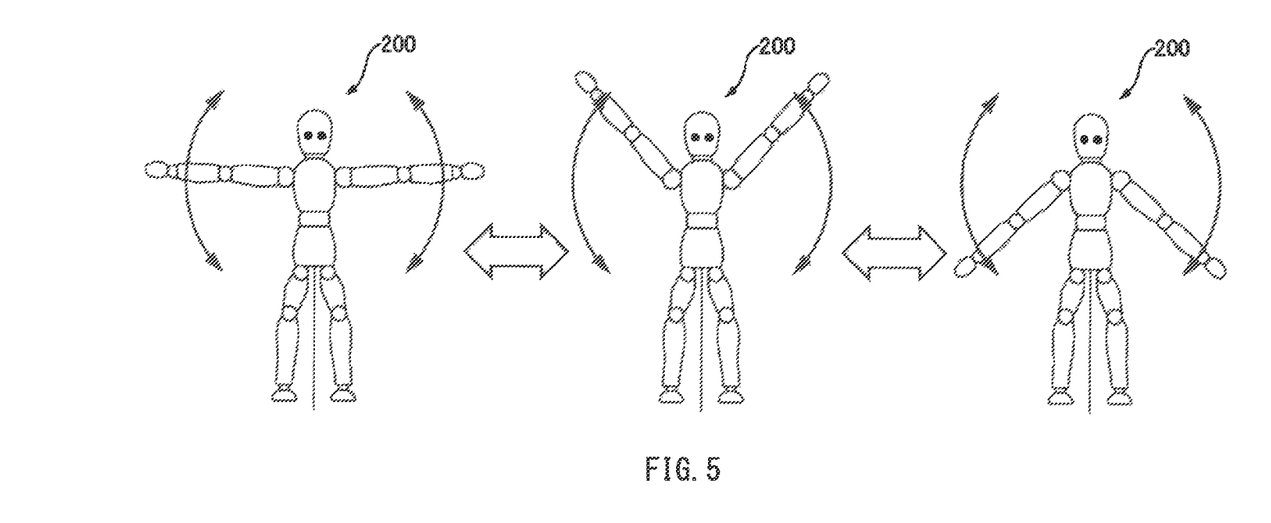
FIG. 5 is an explanatory diagram illustrating an example of an action to be performed by the agent of the agent apparatus according to one example embodiment of the disclosure.

FIG. 5 illustrates an example of an action of the agent 200 for calming down the occupant of the vehicle 100 and a person in the surrounding region of the vehicle 100. For example, the agent ECU 10 may cause the agent 200 to perform an action of showing its palms to a person to whom information is to send and wave its stretched arms greatly in the upper-lower direction. Because palms draw human attention as much as face expressions, showing such a large-scale action of the agent 200 makes it possible, for example, to draw attention of a person who has visually recognized the action of the agent 200 or calm down the person.

Referring again to FIG. 2, the agent ECU 10 may include a central processing unit (CPU) 11, a ROM 12, a RAM 13, and an HDD 14. The HDD 14 may serve as a storage.

The CPU 11 may execute various processes on the basis of a program stored in the ROM 12. In the example embodiment, the CPU 11 may read the program stored in the ROM 12, for example, to a memory such as the RAM 13 and execute the program. The CPU 11 may thus operate as a communication unit 111, an occupant information acquisition unit 112, a vehicle information acquisition unit 113, a surrounding-environment information acquisition unit 114, and an agent control unit 115 illustrated in FIG. 2.

The HDD 14 may hold information to be used by the CPU 11 in operating as the communication unit 111, the occupant information acquisition unit 112, the vehicle information acquisition unit 113, the surrounding-environment information acquisition unit 114, and the agent control unit 115. In the following, a description is given of the communication unit 111, the occupant information acquisition unit 112, the vehicle information acquisition unit 113, the surrounding-environment information acquisition unit 114, and the agent control unit 115.

The communication unit 111 may receive information from other in-vehicle ECUs via the in-vehicle network 3 and supply various kinds of information from the agent ECU 10 to the in-vehicle network 3. For example, upon receiving the impact detection signal supplied from the impact detection ECU 20, the communication unit 111 may acquire the occupant information, the vehicle information, and the surrounding-environment information after detection of an impact on the vehicle 100 by the occupant information acquisition unit 112, the vehicle information acquisition unit 113, and the surrounding-environment information acquisition unit 114, respectively. In addition, the communication unit 111 may perform information transmission and reception with an outside emergency report contact and the communication terminal device that is present in the surrounding region of the vehicle 100 via the communication ECU 60 described above. The CPU 11 may thus be able to send information, for example, regarding the state of the occupant and the state of the vehicle 100 toward the surrounding region of the vehicle 100.

In a case where an impact on the vehicle 100 is detected, the occupant information acquisition unit 112 may acquire the occupant information supplied from the occupant monitoring ECU 30 to the in-vehicle network 3. The occupant information acquisition unit 112 may extract at least information regarding a seating position of the occupant and a body state of the occupant from the occupant information. On the basis of the extracted information, the occupant information acquisition unit 112 may determine, for example, whether the occupant is able to move and whether the occupant is transferable. The occupant information acquisition unit 112 may supply, to the agent control unit 115, the occupant information including a determination result.

In one example, the occupant monitoring ECU 30 may perform the determination, for example, as to whether the occupant is able to move and whether the occupant is transferable, and the occupant information acquisition unit 112 may directly acquire from the occupant monitoring ECU 30 the occupant information including the determination result.

The agent control unit 115 to be described later may acquire such occupant information. Upon causing the agent 200 to operate to send information, for example, in a case where the occupant is heavily injured and is to wait for arrival of an ambulance, the agent control unit 115 may be able to help to prevent the occupant from being transferred without careful consideration. In addition, in a case where the occupant is to be rapidly evacuated from the accident vehicle, the agent control unit 115 may be able to prompt a slightly injured occupant to leave the accident vehicle.

In the case where the impact on the vehicle 100 is detected, the vehicle information acquisition unit 113 may acquire the vehicle information supplied from the vehicle monitoring ECU 40 to the in-vehicle network 3. The vehicle information acquisition unit 113 may extract at least information regarding the temperature inside the vehicle 100 and the load applied to the vehicle 100 from the vehicle information. On the basis of the extracted information, the vehicle information acquisition unit 113 may determine, for example, whether there is a possibility of a fire or an electric leakage in the vehicle 100. The vehicle information acquisition unit 113 may supply, to the agent control unit 115, the vehicle information including a determination result.

In one example, the vehicle monitoring ECU 40 may perform the determination, for example, as to whether there is a possibility of a fire or an electric leakage in the vehicle 100, and the vehicle information acquisition unit 113 may directly acquire from the vehicle monitoring ECU 40 the vehicle information including the determination result. Due to the acquisition of such vehicle information, the agent control unit 115 to be described later may be able to cause the agent 200 to operate, and may thereby be able to give a warning toward the surrounding region of the vehicle 100 and to prompt an occupant to rapidly leave the vehicle 100.

In the case where the impact on the vehicle 100 is detected, the surrounding-environment information acquisition unit 114 may acquire the surrounding-environment information regarding the surrounding environment of the vehicle 100 that is supplied from the surrounding-environment monitoring ECU 50 to the in-vehicle network 3. The surrounding-environment information acquisition unit 114 may extract information regarding a person who is present in the surrounding region of the vehicle 100 and a position of the person from the surrounding-environment information acquired from the in-vehicle network 3. In addition, the surrounding-environment information acquisition unit 114 may determine an instruction target as the information addressee to whom the agent 200 is to send information. The instruction target may be a target to give an instruction regarding an initial procedure.

The surrounding-environment information acquisition unit 114 may supply, to the agent control unit 115, the surrounding-environment information including the position information regarding the person who is present in the surrounding region of the vehicle 100 and designation information regarding the designated instruction target. In one example, the surrounding-environment monitoring ECU 50 may determine the instruction target who is to receive an instruction from the agent 200, and the surrounding-environment information acquisition unit 114 may directly acquire from the surrounding-environment monitoring ECU 50 the surrounding-environment information including the designation information.

Due to the acquisition of such surrounding-environment information, the agent control unit 115 to be described later may be able to determine a person to whom the agent 200 is to give instructions regarding a rescue and the initial procedure, and may be able to determine a direction in which the agent 200 is to face. Even if a plurality of people is present in the surrounding region of the vehicle 100, it is not always the case that everyone tries to proactively perform some procedures. To address this, a person to whom the agent 200 is to give instructions may be designated and the agent 200 may be caused to operate toward the instruction target. This makes it possible to appeal to responsibility and a sense to act proactively of the designated person.

The agent control unit 115 may control the agent 200 on the basis of the occupant information, the vehicle information, and the surrounding-environment information and cause the agent 200 to perform an intended action. The agent control unit 115 may be able to cause the agent 200 to perform various actions on the basis of the occupant information, the vehicle information, and the surrounding-environment information. Examples of the various actions may include: rotating freely, for example, to take a front posture facing the occupant, a back posture showing its back to the occupant, and a posture facing the instruction target present in the surrounding region of the vehicle 100; bending a joint of the agent 200; showing its palm to an intended direction; and moving its arm in the upper-lower and left-right directions.

The HDD 14 may hold information received from the communication unit 111, the occupant information acquisition unit 112, the vehicle information acquisition unit 113, the surrounding-environment information acquisition unit 114, and the agent control unit 115. In addition, the HDD 14 may hold in advance, for example, a table in which actions and speaking contents are associated with the state of the occupant and the state of the vehicle 100.

In the following, a description is given of an agent information sending process to be performed by the agent ECU 10 having the above-described configuration, with reference to flowcharts illustrated in FIGS. 6 to 9.

Figure 6:
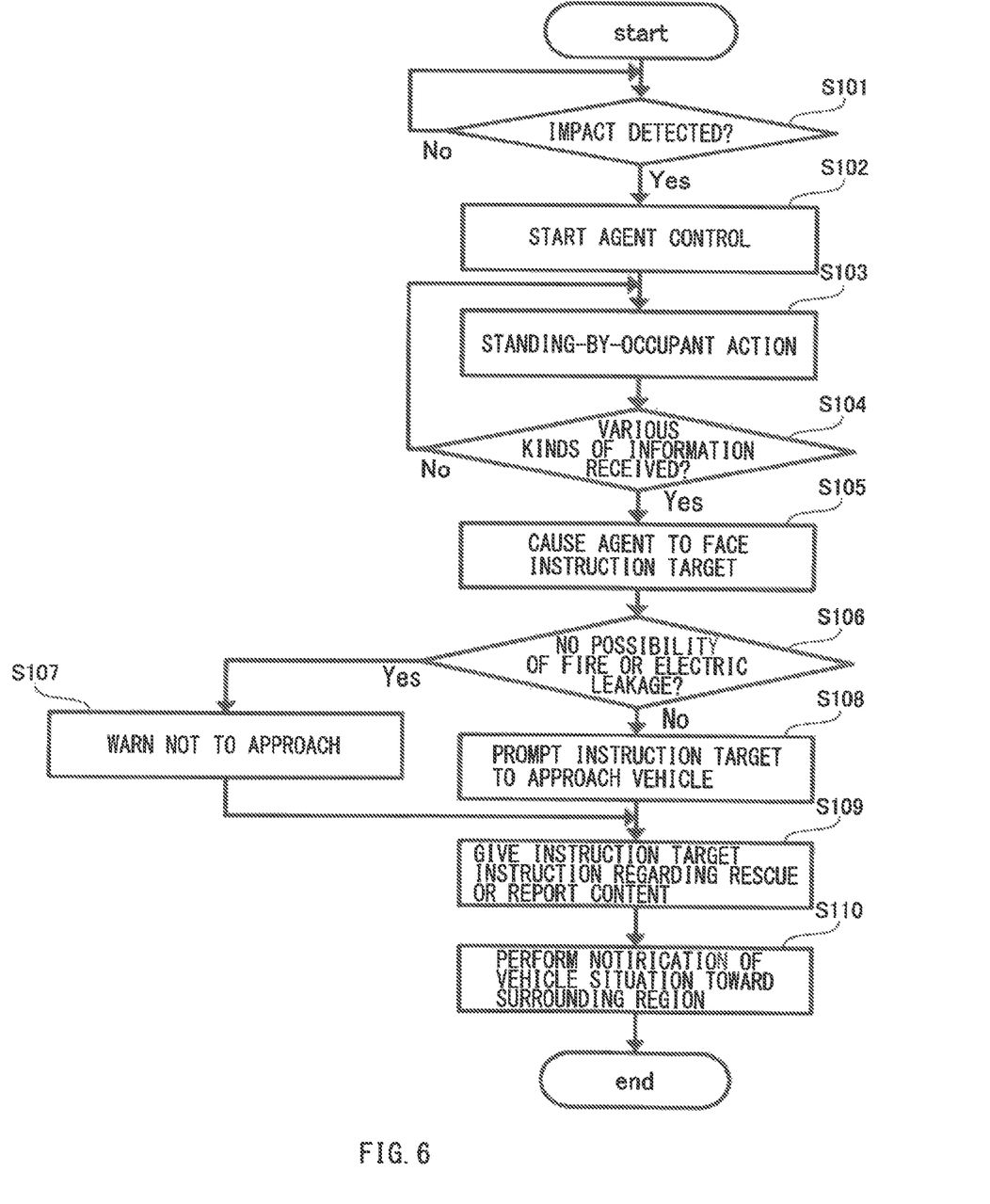
FIG. 6 is a flowchart illustrating a flow of an agent information sending process to be performed by the agent apparatus according to one example embodiment of the disclosure.

FIG. 6 is a flowchart illustrating a flow of an information sending process to be performed by the agent ECU 10.

In step S101, the agent ECU 10 may determine whether an impact has been detected on the basis of the impact detection signal supplied from the impact detection ECU 20. If the agent ECU 10 determines that no impact has been detected (step S101: No), the agent ECU 10 may repeat the determination in step S101. In a case where the communication unit 111 has received the impact detection signal supplied from the impact detection ECU 20, the agent ECU 10 may determine that the impact has been detected (step S101: Yes), and the process may proceed to step S102. In step S102, the agent ECU 10 may transfer to a control mode of sending information by the agent 200, and start to control the agent 200.

In step S103, the agent ECU 10 may cause the agent 200 to perform an action of standing by the occupant. For example, the agent ECU 10 may cause the agent 200 to perform an action of facing the occupant and repeatedly jump, outputting a voice calling for help in association with the jumping, or outputting a voice to perform questioning and confirm safety of the occupant. In addition, the agent 200 may collect a voice of the replying occupant by a device such as a microphone. This makes it possible to establish communication between the agent 200 and the occupant, to thereby calm down the confused occupant and recognize a damage to the occupant.

In one example, in addition to causing the agent 200 to perform the action of standing by the occupant, the agent ECU 10 may supply, by the communication unit 111, information to the communication terminal device such as a smartphone of a person who is present in the surrounding region of the vehicle 100. Examples of the information to be sent may include information regarding the occurrence of the accident of the vehicle 100 and information regarding a damage condition.

While causing the agent 200 to perform the action of standing by the occupant, in step S104, the agent ECU 10 may determine whether the occupant information acquisition unit 112, the vehicle information acquisition unit 113, and the surrounding-environment information acquisition unit 114 have received the various kinds of information. Details of information acquisition by the occupant information acquisition unit 112, the vehicle information acquisition unit 113, and the surrounding-environment information acquisition unit 114 will be described later. If the agent ECU 10 determines that the various kinds of information have not been received (step S104: No), the agent ECU 10 may cause the process to return to step S103.

If the agent ECU 10 determines that the various kinds of information have already been received (step S104: Yes), the agent control unit 115 may control the agent 200 on the basis of the information acquired by the occupant information acquisition unit 112, the vehicle information acquisition unit 113, and the surrounding-environment information acquisition unit 114.

For example, in step S105, the agent control unit 115 may cause the agent 200 to face the instruction target on the basis of the designation information included in the surrounding-environment information.

Causing the agent 200 to face the instruction target and causing the direction of eyes of the agent 200 to match that of the instruction target may allow the instruction target to recognize that he or she is designated as a target who is to receive information from the agent 200. In a case where the agent 200 and the instruction target are away from each other in some degree, the direction of the eyes of the agent 200 may also match with that of a person near the instruction target. Therefore, a plurality of instruction targets may be substantially determined.

Thereafter, in step S106, the agent control unit 115 may determine whether the vehicle information indicates that there is no possibility of a fire or an electric leakage in the vehicle 100. If the vehicle information indicates that there is a possibility of a fire or an electric leakage in the vehicle 100

(step S106: Yes), the process may proceed to step S107. In step S107, the agent control unit 115 may cause the agent 200 to perform an action of warning a person present in the surrounding environment of the vehicle 100, including the instruction target, not to approach the vehicle 100.

If the vehicle information indicates that there is no possibility of a fire or an electric leakage in the vehicle 100 (step S106: No), the process may proceed to step S108. In step S108, the agent control unit 115 may cause the agent 200 to perform an action of prompting the instruction target to approach the vehicle 100. Examples of the action of prompting the instruction target to approach the vehicle 100 may include calling, finger pointing, waving arms, and beckoning. For example, the agent control unit 115 may cause the agent 200 to repeatedly perform a jumping action and to output an electronic voice that calls for help in association with the jumping action, to thereby prompt the instruction target to approach the vehicle 100.

Further, in step S109, the agent control unit 115 may cause the agent 200 to instruct the instruction target to rescue the occupant of the vehicle 100 while following the instruction target and checking whether the instruction target approaches the vehicle 100. For example, the agent control unit 115 may cause the agent 200 to greatly wave its hand upon detecting that the instruction target is approaching.

When the instruction target further approaches, the agent control unit 115 may cause the agent 200 to perform an action indicating a more detailed instruction, for example, by finger pointing.

For example, in a case where the occupant information indicates that a non-transferable occupant is present in the vehicle 100, the agent control unit 115 may cause the agent 200 to prompt the instruction target to visually check inside the vehicle 100 and rapidly report the situation to the emergency report contact. In a case where the occupant information indicates that the occupant inside the vehicle 100 is transferable, the agent control unit 115 may cause the agent 200 to perform an action that prompts the instruction target to open the door of the vehicle 100 and an action that indicates detailed contents for rescuing the occupant.

Thereafter, in step S110, the agent ECU 10 may send information regarding the situation of the vehicle 100, for example, to the communication terminal device present in the surrounding region of the vehicle 100 via the communication unit 111, thereby performing notification, for example, of the situation of the vehicle 100, the accident situation, and the damage situation. In a case where the instruction target has performed a rescue activity, the agent ECU 10 may perform notification of a situation of the rescue activity together.

[Acquisition of Surrounding-Environment Information]

As described above, the surrounding-environment information may be generated or acquired by the surrounding-environment monitoring ECU 50 or the surrounding-environment information acquisition unit 114 on the basis of data supplied from the sensors included in the ADAS coupled to the surrounding-environment monitoring ECU 50. The surrounding-environment information may be referred to by the agent control unit 115 upon determining the action to be performed by the agent 200.

Figure 7:
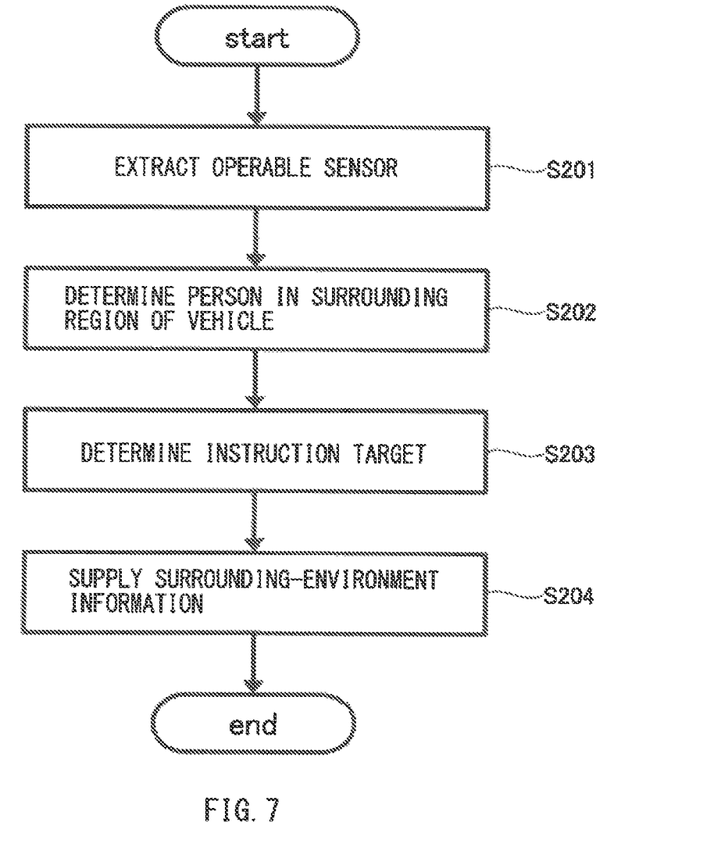
FIG. 7 is a flowchart illustrating a flow of a process of acquiring surrounding-environment information to be supplied to the agent apparatus according to one example embodiment of the disclosure in a vehicle control system.

For example, in a case where the surrounding-environment monitoring ECU 50 generates the surrounding-environment information, the surrounding-environment monitoring ECU 50 may perform a process in accordance with the flowchart illustrated in FIG. 7.

In step S201, the surrounding-environment monitoring ECU 50 may examine a sensor malfunctioning due to the impact on the vehicle 100 and extract an operable sensor among the sensors included in the ADAS coupled to the surrounding-environment monitoring ECU 50. In step S202, the surrounding-environment monitoring ECU 50 may determine a person present in the surrounding region of the vehicle 100 on the basis of the data extracted from the operable sensor. In step S203, the surrounding-environment monitoring ECU 50 may determine the instruction target, for example, on the basis of a distance from the vehicle 100 to the person and position information of the person. In step S204, the surrounding-environment monitoring ECU 50 may supply, to the in-vehicle network 3, the surrounding-environment information including the designation information regarding the instruction target and the position information of the person obtained in step S203. This may allow the surrounding-environment information acquisition unit 114 to acquire the surrounding-environment information.

[Acquisition of Vehicle Information]

As described above, the vehicle information may be generated or acquired by the vehicle monitoring ECU 40 or the vehicle information acquisition unit 113 on the basis of data supplied from the sensor group coupled to the vehicle monitoring ECU 40. The vehicle information may be referred to by the agent control unit 115 upon causing the agent 200 to operate.

Figure 8:
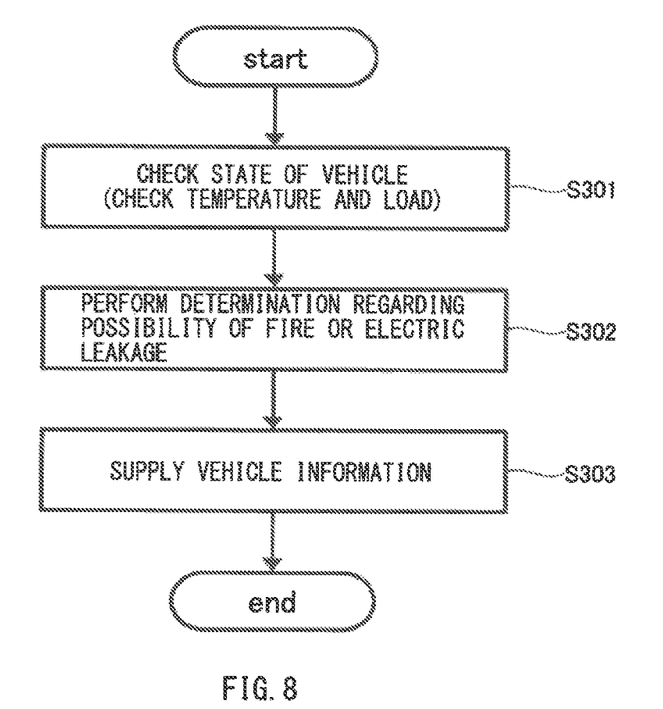
FIG. 8 is a flowchart illustrating a flow of a process of acquiring vehicle information to be supplied to the agent apparatus according to one example embodiment of the disclosure in the vehicle control system.

For example, in a case where the vehicle monitoring ECU 40 generates the vehicle information, the vehicle monitoring ECU 40 may perform a process in accordance with the flowchart illustrated in FIG. 8.

In step S301, the vehicle monitoring ECU 40 may acquire information regarding the temperatures inside and outside the vehicle 100, increase levels of the temperatures, and the load applied to the vehicle 100 and check the state of the vehicle 100 on the basis of the data extracted from the sensor group coupled to the vehicle monitoring ECU 40. The load applied to the vehicle may be recognized, for example, from the driving state of each motor and the state of electricity supply to the in-vehicle device.

In step S302, on the basis of the state of the vehicle 100 checked in step S301, the vehicle monitoring ECU 40 may determine whether a fire or an electric leakage is currently occurring in the vehicle 100 or whether there is a possibility that a fire or an electric leakage is to occur in the vehicle 100 in the near future. In step S303, the vehicle monitoring ECU 40 may supply, to the in-vehicle network 3, the vehicle information including information regarding the possibility of a fire or an electric leakage. This may allow the vehicle information acquisition unit 113 to acquire the vehicle information.

[Acquisition of Occupant Information]

As described above, the occupant information may be generated or acquired by the occupant monitoring ECU 30 or the occupant information acquisition unit 112 on the basis of data acquired from the sensors coupled to the occupant monitoring ECU 30. The occupant information may be referred to by the agent control unit 115 upon causing the agent 200 to operate.

Figure 9:
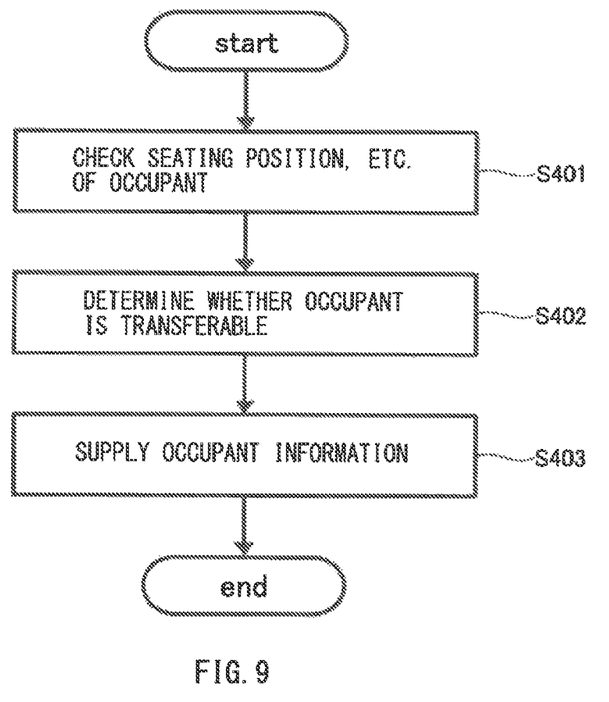
FIG. 9 is a flowchart illustrating a flow of a process of acquiring occupant information to be supplied to the agent apparatus according to one example embodiment of the disclosure in the vehicle control system.

For example, in a case where the occupant monitoring ECU 30 generates the occupant information, the occupant monitoring ECU 30 may perform a process in accordance with the flowchart illustrated in FIG. 9.

In step S401, the occupant monitoring ECU 30 may check the state of each occupant present inside the vehicle 100 on the basis of the data extracted from the sensor group coupled to the occupant monitoring ECU 30. The state of the occupant may include, for example, a seating position, a posture, and a conscious state of the occupant.

In step S402, on the basis of the state of the occupant checked in step S401, the occupant monitoring ECU 30 may determine whether each occupant is at least transferable. In step S403, the occupant monitoring ECU 30 may supply, to the in-vehicle network 3, the occupant information including information regarding whether each occupant is transferable. This may allow the occupant information acquisition unit 112 to acquire the occupant information.

As described above, according to the agent apparatus of the example embodiment, in a case where an impact of a predetermined value or greater on the vehicle 100 is detected, information regarding the occupant, the vehicle 100, and the surrounding environment is acquired, and appropriate information may be sent toward the surrounding region of the vehicle 100 on the basis of the acquired information. Upon sending such information, establishing communication by means of the agent 200 makes it possible to appeal to a sense to act proactively and responsibility of a person who is present in the surrounding region of the vehicle 100 but does not know how to perform an appropriate procedure. In addition, sending various kinds of information makes it possible to prompt the person to execute an appropriate rescue procedure and to associate with a specialized institution such as an emergency report center. This makes it possible to proceed a rescue activity rapidly and smoothly after occurrence of an accident.

That is, according to the example embodiment, in a case where an accident of a vehicle occurs, it is possible to send information corresponding to a situation of the accident toward a surrounding region of the vehicle and thereby perform prompting related to performing an appropriate procedure.

Although some example embodiments of the disclosure have been described in detail with reference to the accompanying drawings, configurations are not limited to those of the example embodiments described above. It should be appreciated that modifications and alterations in designs may be made without departing from the scope of the disclosure and the disclosure is intended to include such modifications and alterations. In addition, any of the example embodiments described above may be combined using the techniques thereof as long as the combination does not involve inconsistency in purpose, configuration, etc.

Each of the CPU 11, the communication unit 111, the occupant information acquisition unit 112, the vehicle information acquisition unit 113, the surrounding-environment information acquisition unit 114, and the agent control unit 115 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the CPU 11, the communication unit 111, the occupant information acquisition unit 112, the vehicle information acquisition unit 113, the surrounding-environment information acquisition unit 114, and the agent control unit 115. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the CPU 11, the communication unit 111, the occupant information acquisition unit 112, the vehicle information acquisition unit 113, the surrounding-environment information acquisition unit 114, and the agent control unit 115 illustrated in FIG. 2.

The invention claimed is:

1. An agent apparatus comprising:
an agent that is an anthropomorphic three-dimensional object configured to change a posture of the agent, and disposed to be visually recognizable at least from an outside of a vehicle;
a memory; and
one or more processor coupled with the memory, the one or more processor configured to:
detect at least one of an accident and an emergency of the vehicle by detecting an impact, using a sensor installed in the vehicle, of a predetermined value or greater on the vehicle,
in a case where the impact is detected, acquire occupant information regarding a state of an occupant of the vehicle,
in the case where the impact is detected, acquire vehicle information regarding a state of the vehicle,
acquire surrounding-environment information regarding a surrounding environment of the vehicle,
operate at least the posture of the agent on a basis of any of the occupant information, the vehicle information, and the surrounding-environment information and show, by using at least the posture of the agent, information toward a surrounding region of the vehicle,
wherein
the surrounding-environment information comprises position information regarding a person who is present in the surrounding region of the vehicle, and
determine a target on a basis of the position information and control the agent to face toward the target, the target being an addressee to which the agent is to send the information.

2. The agent apparatus according to claim 1, wherein the vehicle information comprises information regarding a temperature inside the vehicle and a load applied to the vehicle, and
the one or more processor is configured to, in a case where the vehicle information indicates no possibility of a fire or an electric leakage in the vehicle, control the agent to perform an action of the agent that prompts the target to approach the vehicle.

3. The agent apparatus according to claim 2, wherein the one or more processor is configured to, in a case where the occupant information indicates that the occupant is transferable, control the agent to perform an action that prompts the target to open a door of the vehicle and rescue the occupant.

4. The agent apparatus according to claim 2, further comprising
a communication unit, comprising the one or more processor, configured to perform information transmission and reception with an emergency report contact outside the vehicle and a communication terminal device that is present in the surrounding region of the vehicle, wherein
the agent apparatus is configured to send the occupant information and the vehicle information to the emergency report contact and the communication terminal by the communication unit.

5. The agent apparatus according to claim 2, wherein the one or more processor is configured to control the agent to face the occupant and perform questioning and an action for confirming safety of the occupant in a period from detecting the impact to sending the information to the outside of the vehicle.

6. The agent apparatus according to claim 1, wherein
the occupant information comprises information regarding a seating position of the occupant and a body state of the occupant, and
the one or more processor is configured to, in a case where the occupant information indicates presence of a non-transferable occupant, control the agent to perform an action of the agent that prompts the target to visually check an inside of the vehicle and report to an emergency report contact.

7. The agent apparatus according to claim 2, wherein
the occupant information comprises information regarding a seating position of the occupant and a body state of the occupant, and
the one or more processor is configured to, in a case where the occupant information indicates presence of a non-transferable occupant, control the agent to perform an action that prompts the target o visually check an inside of the vehicle and report to an emergency report contact.

8. The agent apparatus according to claim 1, wherein the one or more processor is configured to, in a case where the occupant information indicates that the occupant is transferable, control the agent to perform an action that prompts the target to open a door of the vehicle and rescue the occupant.

9. The agent apparatus according to claim 1, wherein
the vehicle information comprises information regarding a temperature inside the vehicle and a load applied to the vehicle, and
the processor is configured to, in a case where the vehicle information indicates the possibility of a fire or the electric leakage in the vehicle, control the agent to perform an action that gives a warning not to approach the vehicle.

10. The agent apparatus according to claim 1, further comprising
a communication unit, comprising the one or more processor, configured to perform information transmission and reception with an emergency report contact outside the vehicle and a communication terminal device that is present in the surrounding region of the vehicle, wherein
the agent apparatus is configured to send the occupant information and the vehicle information to the emergency report contact and the communication terminal by the communication unit.

11. The agent apparatus according to claim 1, wherein the one or more processor is configured to control the agent to face the occupant and perform questioning and an action for confirming safety of the occupant in a period from detecting the impact to sending the information to the outside of the vehicle.

12. An agent apparatus comprising:
an agent that is an anthropomorphic three-dimensional object configured to change a posture of the agent, and disposed to be visually recognizable at least from an outside of a vehicle;
a memory; and
one or more processor coupled with the memory, the one or more processor configured to:
   detect at least one of an accident and an emergency of the vehicle by detecting an impact, using a sensor installed in the vehicle, of a predetermined value or greater on the vehicle,
   in a case where the impact is detected, acquire occupant information regarding a state of an occupant of the vehicle,
   in the case where the impact is detected, acquire vehicle information regarding a state of the vehicle,
   acquire surrounding-environment information regarding a surrounding environment of the vehicle,
   operate at least the posture of the agent on a basis of any of the occupant information, the vehicle information, and the surrounding-environment information and show, by using at least the posture of the agent, information toward a surrounding region of the vehicle,
wherein
   the vehicle information comprises information regarding a temperature inside the vehicle and a load applied to the vehicle, and
   in a case where the vehicle information indicates a possibility of a fire or an electric leakage in the vehicle, control the agent to perform an action that gives a warning not to approach the vehicle.

13. An agent apparatus comprising:
an agent that is an anthropomorphic three-dimensional object configured to change a posture of the agent, and disposed to be visually recognizable at least from an outside of a vehicle;
a memory; and
one or more processor coupled with the memory, the one or more processor configured to:
   detect at least one of an accident and an emergency of the vehicle by detecting an impact, using a sensor installed in the vehicle, of a predetermined value or greater on the vehicle,
   in a case where the impact is detected, acquire occupant information regarding a state of an occupant of the vehicle,
   in the case where the impact is detected, acquire vehicle information regarding a state of the vehicle,
   acquire surrounding-environment information regarding a surrounding environment of the vehicle, and
   operate at least the posture of the agent on a basis of any of the occupant information, the vehicle information, and the surrounding-environment information and show, by using at least the posture of the agent, information toward a surrounding region of the vehicle, and
control the agent to face the occupant and perform questioning and an action for confirming safety of the occupant in a period from detecting the impact to sending the information to the outside of the vehicle.

* * * * *